Patented Sept. 4, 1945

2,384,119

UNITED STATES PATENT OFFICE 2,384,119

UNSATURATED ESTERS

Irving E. Muskat, Akron, and Franklin Strain, Norton Center, Ohio, assignors to Pittsburgh Plate Glass Company, Pittsburgh, Pa., a corporation of Pennsylvania No Drawing. Application November 13, 1941,
Serial No. 419,031

4 Claims. (Cl. 260—475)

This invention relates to a new class of unsaturated polymerizable esters which are esters of (a) a polybasic acid and (b) a partial ester of a polyhydroxy compound and an unsaturated acid. Preferably, such partial ester should contain a single free hydroxy group.

Due to the inadequacy of conventional nomenclature, it is necessary to explain the terms as used herein. Common chemical terminology has been used where possible but frequently such common expressions may have several accepted meanings. It is therefore necessary to define the exact scope of these indefinite expressions as intended in this specification.

The expression "ester linkage" as used in this specification refers to a linking oxygen atom which may be regarded as being derived from an acidic compound by reaction with an alcohol. Thus, a carbonate R—O—CO—O—R₁ contains two ester linkages.

The expression "polyacidic compound" has been used herein in the generic sense to include all compounds having two or more acid groups (i. e., acidic OH or —COOH) and which do not contain a free alcohol type of hydroxyl group. The expression is intended to include simple polybasic inorganic acids such as boric, silicic, carbonic, sulphuric, or phosphoric acids, the simple polycarboxylic acids such as oxalic, adipic, maleic, succinic, fumaric, tricarballylic, phthalic, diphenyl dicarboxylic or naphthalic acids, the simple heterocyclic acids such as quinolinic, cinchomeronic, ethylene oxide-α, α'-dicarboxylic or cotarinic acids, or the simple ether acids such as diglycolic, dilactic, and the corresponding thioether acids or methoxysuccinic acids, and the more complex ester acids which contain esters such as glycolyl acid malonate

HOOC—CH₂—COO—CH₂—COOH ethylene bis (acid sulphate)

HO—SO₂—O—C₂H₄—O—SO₂—OH the acid carbonate of lactyl lactic acid

HOOC—CH(CH₃)—O—CO—
            CH(CH₃)—O—CO—OH diglycolyl oxalate

HOOC—CH₂—O—CO—CO—O—CH₂—COOH etc.

The expression "polyhydroxy compounds" is intended to be generic to all compounds having two or more hydroxyl groups which do not have any free acid groups. The hydroxy groups must obviously not be attached directly to carbonyl groups. The expression includes the simple polyhydroxy alcohols such as ethylene glycol, propylene glycol, butylene glycol, trimethylene glycol, pentamethylene glycol, glycerine, methylglycerol, erythritol, or pentaerythritol;, the sugars such as glucose, lactose, sucrose, or maltose; the polymers of polyhydroxy alcohols such as di-, tri-, or tetraethylene glycol, di-, tri-, and tetrapropylene glycol, the polybutylene glycols, polyglycerols, etc.; the cyclic polyhydroxy compounds such as pyrogallol, hydroquinone, 2,5-bis (hydroxymethyl) furan, 3,5-dihydroxycoumarone, dioxanediols, or p,p-dihydroxy-diphenyl ether, and the polyhydroxy esters such as ethylene dilactate

CH₃—CHOH—CO₂—C₂H₄—CO₂—CHOH—CH₃ bis (hydroxyethyl) carbonate (HO—C₂H₄)₂—CO₃, glycol monoglycolate

HO—C₂H₄—O—CO—CH₂OH or diethylene glycol bis (hydroxyethyl carbonate) (HOC₂H₄—CO₃—C₂H₄)₂O.

The expression "hydroxy acid" is used in the broad sense to include all compounds having both acidic groups and alcoholic hydroxyl groups. The generic expression includes aliphatic hydroxy acids such as citric, hydroxy butyric, tartaric, leucinic, saccharic, hydroacrylic, malic, ricinoleic, acetonic, glyceric, lactic and glycolic acids, the aromatic hydroxy acids such as salicylic, gallic, resorcylic, phloritic, and coumaric acids, and the heterocyclic hydroxy acids such as berberonic, alpha-furyl glycolic and 3-hydroxy-coumarone carboxylic (2) acid

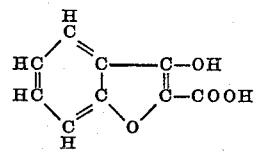

The generic expression hydroxy acids also includes the ester hydroxy acids including theoretical acids such as hydroxyethyl carbonate

HO—C₂H₄—CO₂—OH lactyl lactic acid

CH₃—CHOH—CO₂—CH(CH₃)COOH 2-(hydroxyethyl) carboxymethyl carbonate

HO—C₂H₄—O—C₂H₄—O—CO₂—CH₂COOH or glycol mono (acid sulphate)

HO—C₂H₄—O—SO₂—OH

It is necessary to differentiate between compounds which contain ester linkages between the reactive groups of the compound which separate the unsaturated alcohol radicals of the ultimate esters and those which do not. Accordingly, the expression "polyacidic ester" has been used herein to refer to the class of polyacidic compounds which contain at least one ester linkage between a pair of carboxyl groups. They, of course, contain at least two reactive acidic groups and may not contain reactive alcoholic hydroxy groups. The expressions "simple polyacid" or "simple polybasic acid" are used to denote compounds of more simple structure having no ester linkages in the molecules between the acid groups. Similarly, the expression "polyhydroxy ester" includes the compounds having at least two alcoholic hydroxy groups and no reactive acidic groups but which also contain at least one ester linkage between a pair of hydroxyl groups. The simple polyhydroxy compounds are acid-free compounds in which the hydroxyl groups are not separated by an ester linkage and the simple hydroxy acids are compounds containing acid and hydroxyl groups which are not separated by an ester linkage. These simple compounds may, however, contain more stable, less easily hydrolyzed groups such as ether or thioether groups. The compounds herein contemplated in some cases may also contain tertiary amino groups although it is preferred that the composition be nitrogen free since such products possess greater stability and yield polymers which are more stable and have other characteristics which render them more desirable than nitrogeneous compounds.

For example, the compound derived by reacting allyl lactate with phosgene has the following probable structure:

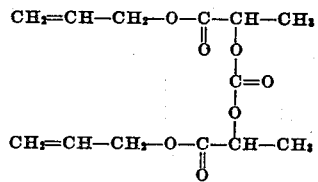

and may be considered to be an allyl ester of the polyacidic compound

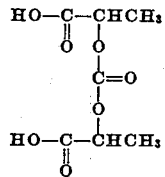

However, since this acid contains ester groups between the acid groups, it is not a simple polyacidic compound but is a polyacidic ester. Additionally, however, the above allyl ester may be regarded as a partial ester of the simple polyacid carbonic acid and allyl alcohol. Oxalic, malonic, or diglycolic acids are simple polyacidic compounds. Likewise, glycol, diethylene glycol or glycerol, etc., are simple polyhydroxy compounds and lactic, ricinoleic, and glycolic acid are simple hydroxy acids.

It will be apparent that many of the acids, hydroxy compounds and hydroxy acids contemplated within the above definitions may not exist as such in the free state and consequently, may be theoretical compounds. Since their esters may be prepared, however, it is often convenient to regard such esters as esters of such theoretical acids.

These new esters contain one or more groups derived from unsaturated monobasic acids, preferably having up to five carbon atoms, such as acrylic, methacrylic, alpha-ethylacrylic, alpha-aminoacrylic, crotonic, vinylacetic, tiglic, angelic, propiolic, tetrolic, pentenoic, or the corresponding halogen substituted acids such as alpha or beta-chloroacrylic, chlorocrotonic, or the bromoacrylic acids. Unsaturated acids having six to ten carbon atoms are also useful. Unsaturated acids having six to ten carbon atoms are also useful, such as hexenic, tereacrylic, amylpropiolic, cinnamic, or phenyl propiolic acids.

The new unsaturated esters are the esters of (a) a polyacidic compound, preferably a simple polybasic acid and (b) an ester containing a free hydroxy group and which is a partial ester of a polyhydroxy compound and a monobasic unsaturated acid. Such partial esters are for convenience termed "hydroxy esters." There are several principal types of these hydroxy esters from which both mono and polyesters of a polybasic acid may be prepared.

A first type of hydroxy ester includes the partial esters of an unsaturated monobasic acid and a simple polyhydroxy compound such as glycol monoacrylate, glycerol diacrylate, glycerol-monoacrylate - mono - oleate, glycerol - monoacrylate-mono-acetate, glycerol-monoacrylate-monostearate, diethylene glycol monoacrylate, dipropylene glycol monoacrylate, triethylene glycol monoacrylate, resorcinol monoacrylate, pyrogallol diacrylate, pentaerythritol triacrylate, etc., and the corresponding methacrylates, crotonates, tiglates, cinnamates, chloroacrylate, etc. The hydroxy esters may be prepared, for example, by esterifying the simple polyhydroxy compound with a quantity of unsaturated acid such as to produce a partial ester usually in the presence of an esterification catalyst such as phenolsulphonic acid or toluenesulphonic acid and also in the presence of a polymerization inhibitor.

A second type of monohydroxy ester includes the mixed esters of a simple polyhydroxy compound and a monohydroxy carboxylic acid and an unsaturated monobasic acid. Preferably this class of hydroxy ester contains but a single group derived from the hydroxy acid and the remaining polyhydroxy groups of the polyhydroxy compound are esterified with unsaturated acid or acids or with an unsaturated acid and a saturated acid, such as ethylene glycol-monolactate-monomethacrylate, propylene glycol-monolactate-mono - methacrylate, glycerol - monolactate - dimethacrylate, diethylene glycol - monolactate-monomethacrylate, resorcinol - monolactate-monomethacrylate, glycerol-monoacrylate-monolactate-monostearate, etc., and the corresponding acrylate, crotonates, cinnamates, and the corresponding glycolates, salicylates, hydroxy butyrates, etc. These esters may be prepared by partially esterifying a chlorhydrin such as ethylene chlorhydrin, propylene chlorhydrin, glycerol chlorhydrin, etc., with an unsaturated monobasic acid and then reacting the resulting compound with a silver salt of an hydroxy acid. They may also be prepared by ester interchange reactions or by partially saponifying a polyester and reacting the partial ester with the acid or acid chloride in question.

A third type of hydroxy ester is a mono or polyester of a simple polyhydroxy compound and an acid ester which acid ester is a simple hydroxy monobasic acid, the hydroxy group of which is esterified with an unsaturated monobasic acid.

Suitable hydroxy esters of this type are ethylene glycol mono(acrylyl lactate)

(HO—C$_2$H$_4$—O—CO—CH(CH$_3$)—O—CO—CH=CH$_2$)

diethylene glycol mono (acrylyl lactate), glycerol bis (acrylyl lactate), pyrogallol bis (acrylyl lactate) etc., and the corresponding methacrylyl, chloroacrylyl, crotonyl, tiglyl, linoleyl, derivatives, etc., and the corresponding glycolates, salicylates, valerolactinates, etc. These hydroxy esters may be prepared from the esters of an unsaturated monobasic acid and a simple hydroxy acid such as by treating such esters with alkylene oxides such as propylene oxide, or ethylene oxide. They may also be prepared by reacting a metal salt such as the silver salt of the ester of (a) an unsaturated monobasic acid and (b) a simple hydroxy acid with an alkylene chlorhydrin or bromohydrin.

A fourth type of hydroxy ester includes the esters of (a) a partial ester of a polyhydroxy compound and a monobasic unsaturated acid such as glycol monoacrylate and (b) an acid ester of a simple polybasic acid and a polyhydroxy compound such as the phthalic acid monoester of ethylene glycol

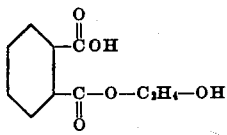

Suitable esters of the fourth type are as follows: ethylene glycol mono 2-methacryloxyethyl phthalate, glycerol bis 2-methacryloxyethyl phthalate, pyrogallol bis 2-methacryloxyethyl phthalate, etc., and the corresponding carbonates, succinates, adipates, oxalates, etc., and the corresponding derivatives of diethylene glycol, glycerol, resorcinol, propylene glycol, etc. The fourth type ester may be prepared by reacting partial esters of (a) an unsaturated monobasic acid and (b) a simple polyhydroxy compound with an anhydride of a polybasic acid such as succinic, phthalic, or adipic anhydrides. The resulting product is then treated with alkylene oxides.

A preferred form of the four types of hydroxy esters is the form in which the ester chains are all terminated by radicals derived from unsaturated monobasic acids. These may be represented by the formulae:

(1) $Z(R)_{n-1}$
(2) $Y_1(Z(R)_{n-1})^a$
(3) $Z(Y_2)_b)_{n-1}$
(4) $Z(X(Z(R)_{n-1})_{m-1})_{n-1}$ in which R is the radical of an unsaturated monobasic acid, X is the radical of a polybasic acid having (m) acid groups, Y$_1$ is the radical of a monohydroxy acid having (a) acid groups, Y$_2$ is the radical of an hydroxy monoacid having (b) hydroxy groups and Z is the radical derived from a polyhydroxy compound having (n) hydroxyl groups. These formulae represent a preferred modification in which all of the ester chains are termined by unsaturated acid radicals. It should be understood that some of the ester chains may be terminated with saturated acid or saturated alcohol radicals or with unreacted carboxylic acid or hydroxyl groups.

Preferably, the new compounds herein contemplated are esters of a simple polybasic acid with two or more molecules of any one of the above described hydroxy esters. This group of compounds may be said to be symmetrical with respect to the polybasic acid group. They may be prepared by reacting the polyacid chlorides of polybasic acids such as phthalyl, succinyl, or malonyl chloride with the hydroxy esters prepared as above described. This reaction may be conducted, for example, at temperatures between 0 and 25° C. and in the presence of pyridine or other tertiary cyclic amine or an oxide, carbonate, or hydroxide of an electronegative metal such as sodium, potassium, calcium, barium, or strontium. The carbonates are prepared by reacting the hydroxy esters with phosgene in the presence of an alkaline reagent. These reactions may be conducted in the presence of a solvent or diluent such as ether, benzene, carbon tetrachloride, alcohol, or chloroform.

The new unsaturated esters may be esters of (a) any of the above hydroxy esters with (b) any polyacid. In accordance with one modification of the invention, such polyacid may be a polyacidic ester which comprises a single molecule of a polyhydroxy compound esterified with a plurality of molecules of polybasic acid such as

HOOC—C$_2$H$_4$—CO—O—C$_2$H$_4$—O—OC—C$_2$H$_4$—COOH

These compounds may be considered to be symmetrical with respect to the polyacidic ester. They may be prepared by reacting any of the above described four types of hydroxy esters with anhydrides of polybasic acids. The resulting acid ester is then converted to an acid chloride by reaction with thionyl chloride and treated with ½ of a chemical equivalent of a polyhydroxy compound. The same compounds may alternatively be prepared by reacting a simple polyhydroxy compound with an excess of two molecular equivalents of an anhydride of a polybasic acid. The resulting acidic ester is then treated with thionyl chloride and the acid chloride produced thereby is reacted with two molecular equivalents of one of the above mentioned hydroxy esters.

The corresponding carbonates are readily prepared by reacting the said hydroxy esters with phosgene to form chloroformates which are then inter-reacted with an equivalent quantity of polyhydroxy compound. The same esters may be prepared by treating the polyhydroxy compound with phosgene to form a polychloroformate such as ethylene glycol dichloroformate which is then reacted with the desired hydroxy ester in equivalent proportions.

Unsymmetrical or mixed esters may be prepared if desired. For example, an anhydride of a polybasic acid such as phthalic anhydride may be reacted with an hydroxy ester such as glycol monoacrylate or glycol monoacrylate-monolactate. The resulting acid ester may be reacted with a different hydroxy ester such as glycol monocrotonate or the acid ester may be converted to an acid chloride by reaction of thionyl chloride and the acid chloride reacted with a different hydroxy ester. The carbonate of the unsymmetrical modifications may be prepared by treating one hydroxy ester with phosgene forming the chloroformate which may then be treated with a molecular equivalent of another hydroxy ester in the presence of an alkaline agent. Thus, glycol monoacrylate may be reacted with phosgene to form the ester, glycol-monoacrylate-monochloroformate. This product may then be reacted with a suitable hydroxy ester such as glycol monomethacrylate or glycol monolactate, monoacrylate, etc., to form a carbonate ester.

Similar esters of other polybasic acids may be prepared.

In accordance with a further modification, other mixed esters may be prepared by reaction of one of the above hydroxy esters such as glycol monoacrylate or glycol monoacrylate-mono-lactate with an acid ester of a polybasic acid and a saturated or unsaturated alcohol or acid chloride thereof such as allyl acid phthalate, allyl phthalyl chloride, or the corresponding methallyl, crotyl, oleyl, ethyl, butyl, or stearyl derivatives of polybasic acids or with the corresponding chloroformates such as allyl, methallyl, methyl, propyl, oleyl, or stearyl chloroformate.

Often the method of preparing these compounds is such as to produce a mixture containing the desired ester and other esters formed due to side reactions. Such mixtures may be difficult to fractionate due to the high boiling points of the products. Nevertheless, they may be used as such after the removal of water soluble impurities by washing and after the removal of low boiling materials by distillation.

The new esters are generally nonresinous chemical compounds having predetermined number of ester linkages, preferably six or less but which may have as many as ten within the molecule. In this respect the esters are readily distinguishable from alkyd resins which contain an indefinite and usually very large number of ester linkages in each molecule.

The unsaturated esters described herein are generally high boiling liquids, some of which are capable of being distilled at reduced pressures. Other esters are solid at normal temperatures. Most of the liquid esters are clear, colorless and miscible with numerous organic solvents such as acetone, alcohol, chloroform, dioxane, benzene, xylene, toluene, ethyl ether, paraffin hydrocarbons, etc. The monomeric esters are valuable as plasticizers for various resin materials, such as styrene, cellulose, vinyl, urea, protein, phenolic, or acrylic resins. Other uses such as solvents, insecticides, and liquid coating compositions are noteworthy.

An important use of the new compounds involves their polymerizability in the presence of heat or light and a catalyst to yield solid or liquid compositions of widely different physical properties. The polymerization is preferably conducted in the presence of catalysts such as oxygen, ozone, or organic peroxides such as lauryl, benzoyl, and acetone peroxides.

The products of polymerization vary greatly in their physical properties, depending upon the molecular structure of the monomer as well as upon the extent of polymerization. In general, the polymers of esters which contain at least two unsaturated groups of the type described are transparent and colorless and upon complete polymerization, a resin which is substantially insoluble and infusible at atmospheric pressure is produced. On the other hand, the monomers containing a single unsaturated group polymerize to form thermoplastic products.

The completely polymerized poly-unsaturated esters are substantially unaffected by acids, alkalies, water and organic solvents. Intermediate polymers having a wide range of properties may, however, be secured. Upon the initial polymerization of liquid monomers or solutions of the monomers in suitable solvents, an increase in viscosity of the liquids is noticeably due to the formation of a simple polymer which is soluble in the monomer and in solvents such as acetone, benzene, xylene, dioxane, toluene, or carbon tetrachloride. Upon further polymerization, the liquid sets up to form a soft gel containing substantial portions of polymers which are insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalyst to the final infusible insoluble state.

The polyunsaturated monomers may be cast polymerized directly to the insoluble infusible state. This procedure is subject to certain inherent difficulties due to the reduction in volume during the polymerization. Often during polymerization strains are established in the hardening gel which frequently result in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymer may be freed from the mold to which it adheres strongly. When released the polymer contracts substantially thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide temperatures of 65 to 80° C. are suitable, while for acetone peroxide, temperatures of 140–150° C. may be used. The soft sheet of gel is then freed of the mold and in accordance with one modification, the gel may be coated on both sides with monomer or the syrupy polymer. The coated article is then polymerized between smooth heated plates to the final insoluble state.

In order to inhibit formation of cracks during the initial polymerization it is frequently desirable to minimize the polymerization on one side of the sheet. This is done by conducting the polymerization in the presence of a peroxide such as benzoyl peroxide with one side exposed to the air or other polymerization inhibitor. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects. These methods are described and claimed in an application for Letters Patent Serial No. 392,111, filed May 6, 1941, by Vincent Meunier, and an application Serial No. 398,241, filed June 16, 1941, by Irving E. Muskat.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylenediamine, or sulphur, or by destruction of the polymerization catalyst. The fusible polymer may be separated from all or part of the monomer by any of several methods. It may be precipitated by addition of nonsolvents for the fusible polymer such as water, ethyl alcohol, methyl alcohol or glycol. Alternatively, it may also be separated from the monomer by distillation in the presence of an inhibitor for polymerization, and preferably, at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of a suitable quantity, for example 0.1 to 1.0 percent of benzoyl peroxide until the viscosity of the solution has increased about 100 to 500 percent. This may require several hours while heating at 65 to 85° C. in the presence of benzoyl peroxide. When the resulting viscous solution is poured into an equal volume of water, methyl or ethyl alcohol, glycol, or other nonsolvent for the fusible polymer, whereby a polymer, usually in the form of a powder or a gummy precipitate, which may be filtered and dried, is obtained. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial proportion of fusible polymer may be digested with a quantity of solvent for the fusible polymer to extract the fusible gel from the infusible. The solution may then be treated as above described to separate the fusible polymer from the solution. These polymers may be used as molding or coating compositions. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting the polymerization at an elevated temperature and/or pressure in the presence of a suitable quantity, for example up to 5 percent of benzoyl peroxide generally in a heated mold. The polymers may be mixed with fillers such as alpha cellulose, wood pulp and other fibrous substances, mineral fillers or pigments such as zinc oxide or calcium carbonate, lead chromate, magnesium carbonate, calcium carbonate, lead chromate, calcium silicate, etc., plasticizers such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichlorethyl ether, dibutyl phthalate, or mixtures thereof, is useful as a liquid coating composition. Objects of paper, metal, cloth, wood, leather or synthetic resins may be coated with the solution of polymer in solvent and subsequently polymerized to yield attractively finished coatings. Similarly, porous objects of felt, cloth, paper, leather, etc., either in single layers or laminated may be impregnated with the dissolved fusible polymer and subjected to the polymerization to the final insoluble infusible state.

While the polymerization of the polyunsaturated compounds is of particular interest because of their comparative infusibility, it should also be noted that the monounsaturated compounds such as the reaction product of glycol monoacrylate with an alkyl chloroformate may be polymerized to form thermoplastic resinous products by means of heat and/or light and in the presence of usual polymerization catalyst. Syrups, powders, and cast or molded sheets of such polymers may be obtained.

The following examples are illustrative:

*Example I*

110 grams of glycol monoacrylate was dissolved in 100 grms. of pyridine, 100 gms. of phthalyl chloride was dissolved in 500 cc. of benzene and the solution was added slowly to the glycol monoacrylate solution at the rate of approximately 4 grams per minute while maintaining the temperature below about 10° C. When 110 gms. of the glycol monoacrylate had been added the reaction mixture was removed from the ice bath and permitted to warm to room temperature. The benzene solution was washed with water and dried over sodium sulphate. The benzene was evaporated by heating in a vacuum. The resulting ester was a liquid which is believed to have the structure:

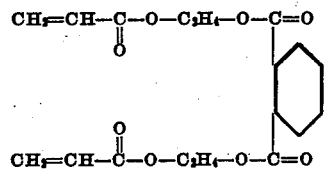

The ester polymerized upon heating for several hours at 75° C. in the presence of 0.5 percent of benzoyl peroxide to form a clear, hard polymer.

Example II

One mole of diethylene glycol monomethacrylate (174 gms.) was dissolved in 1000 cc. of benzene and 200 gms. of pyridine. Phosgene gas was bubbled through at a rate of 20 millimoles per minute for one-half hour. During the reaction the temperature was maintained below 12° C. by cooling on an ice bath. When the reaction was completed the mixture was warmed slightly. The benzene solution of the ester was washed with dilute HCl and with water and finally dried over sodium sulphate. The benzene was evolved by heating gently at reduced pressures. The ester was a liquid which is believed to have the following probable structure:

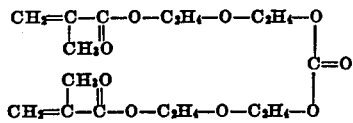

Example III 120 gram of di(β-chloroethyl) succinate was dissolved in benzene warmed to 60-70° C. and added slowly with stirring to 250 grams of the silver salt of lactyl methacrylate suspended in 500 cc. of benzene. The resulting mixture was stirred for two hours. The benzene solution was filtered, washed with dilute sodium carbonate solution and water and again with water. The solution was dried over anhydrous sodium sulphate. The benzene was removed by heating gently at reduced pressures. The ester has the following structure:

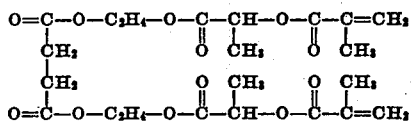

Example IV

A 20 grams sample of the ester prepared in Example II was dissolved in 100 cc. benzene mixed with 0.5 percent benzoyl peroxide and heated at 60° C. until the viscosity of the solution approximately doubled. The solution was then poured into 150 cc. of methyl alcohol and a white polymer was precipitated. The polymer was filtered, washed, and dried to produce a pulverulent solid which was soluble in many organic solvents. A five-gram portion of the solid polymer was mixed with 1 percent benzoyl peroxide and pressed in a mold at 135° C. and 1500 pounds per square inch pressure. A hard, transparent, solid, substantially insoluble resin was produced.

Example V

Equal moles of beta-chloroethyl beta-hydroxyethyl ether (125 gms.) and methacrylic acid (86 gms.) and 1 gm. of pyrogallol were refluxed in 1000 cc. benzene. The benzene was returned to the system and refluxing continued until evolution of water ceased. This product was washed with water to remove water soluble impurities. To the resulting product was added a one-half molar quantity of the silver salt of bis (1-carboxy ethyl) adipate. The latter compound was prepared by reaction of adipic anhydride with lactic acid followed by neutralization of the resulting acidic ester with sodium hydroxide solution and reaction of the neutralized mixture with silver nitrate, whereby the silver salt was precipitated. The solid silver salt was added to the benzene solution while the mixture was being stirred vigorously. When the reaction was completed the precipitate of silver chloride was filtered off. The benzene solution of the water was washed with dilute HCl, with dilute Na₂CO₃ and with water. The benzene was separated from the ester by evaporation under reduced pressure. The ester was believed to have the structure:

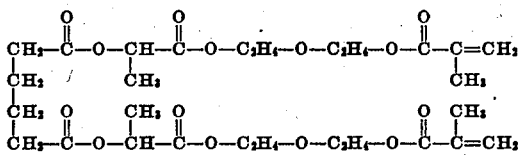

Example VI 125 grams of ethylene bromohydrin was reacted with 72 gms. of acrylic acid by heating in a benzene solution in the presence of one percent hydroquinone and at reflux temperature and removing a benzene-water azeotrope from the system. The reaction was continued until evolution of water ceased. The mixture was washed with water to remove water soluble impurities. The solid silver salt of glycol bis (acid phthalate) was added to the benzene solution and the mixture was stirred and refluxed in the presence of 1 percent hydroquinone for ten hours. The benzene solution of the resulting ester was washed with dilute HCl and with water and dried over Na₂SO₄. The resulting ester was believed to have the structure:

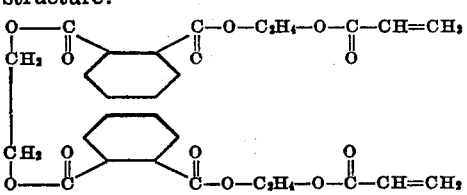

Example VII

The diacrylate of glycerol was prepared by reacting sodium acrylate with glycerol dichlorohydrin. One mole (200 gms.) of this ester was mixed with 100 gms. of pyridine and 1000 cc. of benzene. 115 gms. of diethylene glycol dichloroformate was added slowly while maintaining the reaction temperature below 10° C. by means of an ice bath. After an hour the addition was completed. The reaction mass was permitted to stand for one hour. The benzene solution was washed with dilute HCl and water and finally dried with anhydrous sodium sulphate. The benzene was evaporated by heating at reduced pressures. The ester was believed to have the structure:

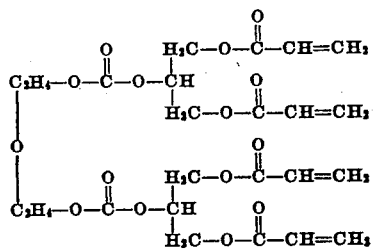

Upon heating with 0.5 percent benzoyl peroxide at 90° C., the ester polymerized to form a hard solid.

*Example VIII*

Eighty-five grams of α-methacrylyloxypropionic acid were heated to 60° C. in 1000 cc. of benzene. Ethylene oxide was passed into the mixture for one hour at a rate of 5 to 10 millimoles per minute. The benzene solution was cooled to approximately 0° C. and phosgene was bubbled through at a rate such that the temperature of the mixture remained below 10° C. at all times. When the solution became saturated and the reaction was complete, the resulting chloroformate solution was washed with water and dried. The benzene was removed from the chloroformate by heating at reduced pressures. Fifty-five grams of glycol monomethacrylate were dissolved in 1000 cc. of benzene and 75 gms. of pyridine in a two-liter flask. The mixture was cooled to −2° C. with salt-ice mixture. The chloroformate was then added slowly at a rate of two grams per minute for fifteen minutes and then at the rate of three to five grams per minute, for one-half hour. After all the chloroformate had been added the mixture was permitted to stand for three hours. The ester was then washed with water and dried. The benzene was removed by distillation at 2 to 10 mm. pressure. The product was a liquid mixture which was believed to contain the ester:

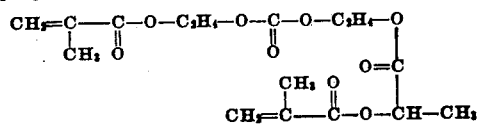

*Example IX*

One-hundred grams of the monoester of glycol and α-methacrylyloxypropionic acid prepared as described in Example VIII was dissolved in 1000 cc. of benzene and mixed with 60 grams of pyridine. Ninety grams of ethylene glycol dichloroformate, made by saturating ethylene glycol with phosgene at reduced temperatures was added dropwise at a rate of one to two grams per minute.

During the reaction the mixture was maintained at temperatures between 0° C. and +10° C. The benzene solution of the ester was washed with dilute HCl, with Na₂CO₃ solution, and finally with water. After drying one gram of activated charcoal was added and the benzene was distilled off at an absolute pressure of 2 to 8 mm. of mercury. After filtering a water-white liquid ester was obtained. Its structural formula was believed to be:

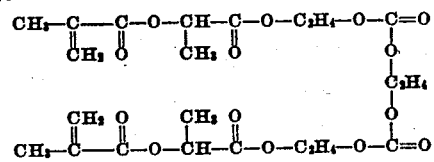

*Example X*

The procedure of Example I was repeated using succinyl chloride in place of phthalyl chloride and diethylene glycol monomethacrylate as the hydroxy ester. The following liquid ester was produced:

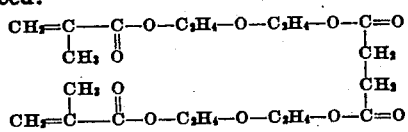

*Example XI*

The procedure of Example I was repeated using adipyl chloride in place of phthalyl chloride and trimethylene glycol monocrotonate as the hydroxy ester. The following liquid ester was produced:

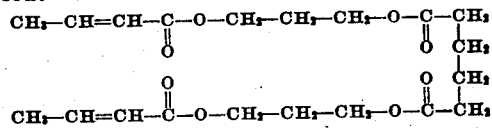

Although the invention has been described with respect to certain specific details, it is not intended that such details shall be regarded as limitations upon the scope of the invention except as incorporated in the following claims.

This application is a continuation-in-part of application Serial No. 361,280, filed October 15, 1940, by Irving E. Muskat and Franklin Strain.

We claim:

1. As a new compound, a neutral ester of a dicarboxylic acid and two molecular equivalents of a half ester of a glycol and a monocarboxylic acid having an olefine linkage in the alpha-beta position in an aliphatic carbon chain.

2. Bis (glycol monoacrylate) phthalate.

3. Bis (diethylene glycol monomethacrylate) succinate.

4. Bis (trimethylene glycol monocrotonate) adipate.

IRVING E. MUSKAT.
FRANKLIN STRAIN.